United States Patent [19]

Rue

[11] 4,093,252

[45] June 6, 1978

[54] SCOOTER BOARD

[75] Inventor: John Rego Rue, Marietta, Ga.

[73] Assignee: Charles A. Burrell, Marietta, Ga. ; a part interest

[21] Appl. No.: 763,247

[22] Filed: Jan. 28, 1977

[51] Int. Cl.² .............................................. B62K 9/00
[52] U.S. Cl. ............................................. 280/87.04 A
[58] Field of Search ................ 280/87.04 R, 87.04 A, 280/11.1 BT, 11.23

[56] References Cited

U.S. PATENT DOCUMENTS

| 887,812 | 5/1908 | Johnson | 280/87.04 A |
| 1,056,357 | 3/1913 | Murdock | 280/87.04 R |
| 1,732,374 | 10/1929 | Neal | 280/87.04 R |
| 2,330,147 | 9/1943 | Rodriguez | 280/87.04 R |
| 3,620,547 | 11/1971 | Vaverek | 280/87.04 A |
| 3,751,062 | 8/1973 | White | 280/87.04 A |
| 3,827,706 | 8/1974 | Millman | 280/87.04 A |

FOREIGN PATENT DOCUMENTS 21,056 of 1898 United Kingdom ............. 280/11.23

Primary Examiner—John A. Pekar
Attorney, Agent, or Firm—Newton, Hopkins & Ormsby

[57] ABSTRACT

A highly maneuverable scooter type coaster vehicle embodies a foot board having fore and aft caster wheels on its bottom side adapted to swivel through a full 360°. A forward balancing and maneuvering handle extends upwardly from the foot board and has a hand grip substantially directly above the forward caster wheel. The vehicle can be maneuvered primarily by shifting the weight of the rider and applying pressure with the feet in a variety of modes.

8 Claims, 14 Drawing Figures

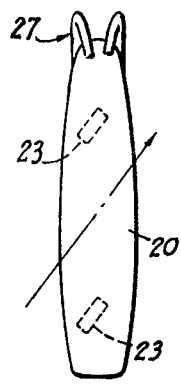
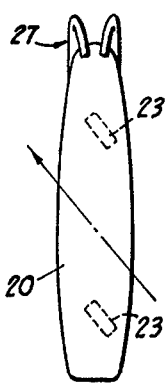
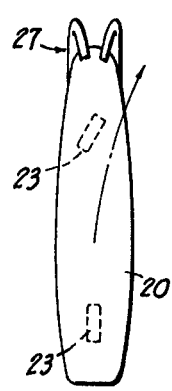
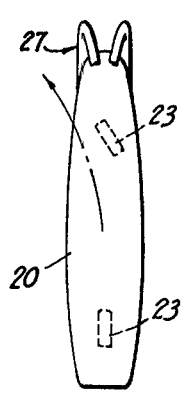
FIG 5   FIG 6   FIG 7   FIG 8
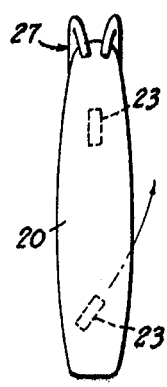
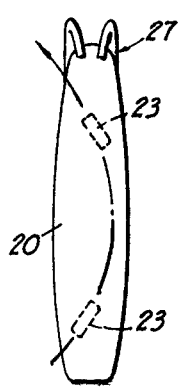
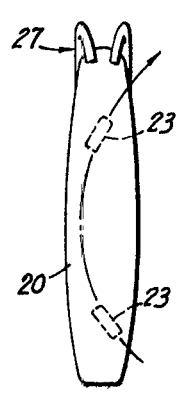
FIG 9   FIG 10   FIG 11   FIG 12
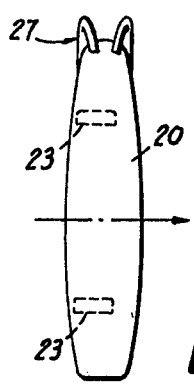
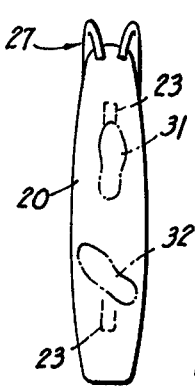
FIG 13   FIG 14

SCOOTER BOARD

BACKGROUND OF THE INVENTION

Scooter vehicles, broadly speaking, are well known in the prior art, as are skate boards. Some examples of the patented prior art are contained in U.S. Pat. Nos. 1,056,357; 1,227,888; 1,706,048; 2,027,620; 3,362,722 and 3,620,547.

The objective of this invention is to improve on the known prior art by providing a scooter type vehicle which is more maneuverable and more exciting to ride than prior art scooter types while maintaining a satisfactory degree of safety for the rider. In this connection, the invention is something of a compromise between prior art scooter vehicles and the present-day extremely popular skate boards, the latter possessing no steering or balancing handles and being recognized as being quite dangerous.

Neither conventional scooters nor skate boards are equipped with tandem caster wheels, and most scooter vehicles possess steering handles which turn or steer the front wheel of the scooter. The present invention is a departure from all traditional types of coaster vehicles in that it features a foot board on which the rider places both feet, a pair of tandem caster wheels which can revolve independently a full 360° around axes normal to the foot board, and a front balancing and guidance handle which extends above the foot board in rigid relation therewith without any operating connection with the front caster wheel which is freely swiveled independently of the front handle.

Maneuvering of the vehicle by the rider is accomplished primarily through foot pressure on the foot board in response to shifting of body weight near the center of the foot board. A wide variety of movements are possible while the vehicle is in motion and after practice the complexity of maneuvers can be increased with a resulting increase in excitement on the part of the rider.

BRIEF DESCRIPTION OF THE DRAWINGS

FIGS. 5 through 13 are diagrammatic plan views depicting various maneuvers which can be accomplished by a rider of the vehicle.

FIG. 14 is a diagrammatic plan view depicting usual position of the feet of a rider on the foot board.

DETAILED DESCRIPTION

Figure 1:
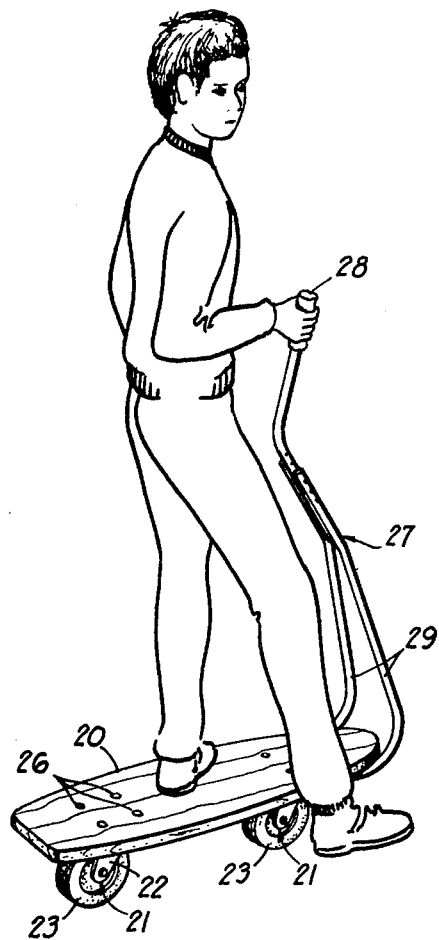
FIG. 1 is a perspective view of a vehicle embodying the invention.
Figure 2:
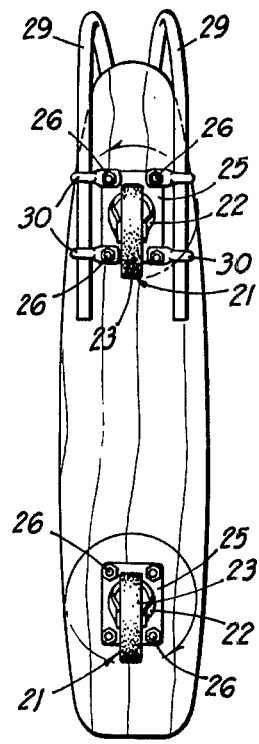
FIG. 2 is a bottom plan view of the vehicle.

Referring to the drawings in detail, wherein like numerals designate like parts, a scooter vehicle according to the invention embodies an elongated flat essentially rigid foot board or plate 20 which may be rounded at its ends and corners for the sake of appearance and safety. A pair of fore and aft single wheel casters 21 is attached to the bottom of the foot board 20 in tandem relation at the longitudinal center of the foot board. Each caster is free swiveling about an axis normal to the foot board 20 through a full 360° of rotation in either direction, as indicated by the arrows in FIG. 2.

Figure 4:
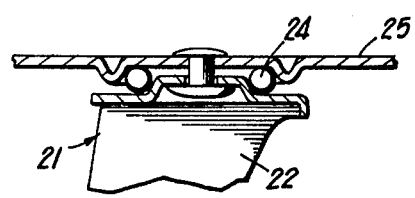
FIG. 4 is an enlarged fragmentary vertical section taken through a caster wheel swivel bearing.
Figure 3:
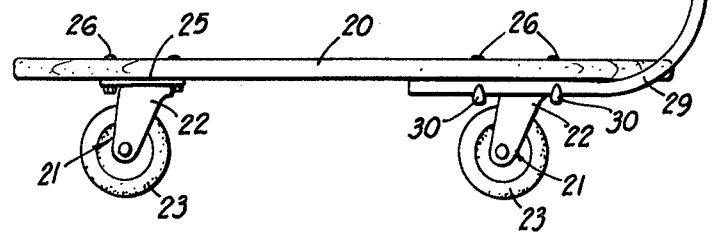
FIG. 3 is a side elevation of the vehicle.

Each caster embodies a yoke 22 on which the caster wheel 23 is freely journaled and the yoke 22 is swiveled freely as by ball bearing means 24, FIG. 4, to a mounting plate 25 which is attached directly to the bottom of the foot board 20 by bolts 26.

The vehicle has a front balancing handle 27 which also assists somewhat in maneuvering the vehicle. The handle 27 extends considerably above the foot board 20, and has a hand grip 28 at its top end substantially directly above the front caster 21. The handle 27 has lower end bifurcations 29 which are secured fixedly against the bottom of the board 20 by clamps 30 which are secured by the front caster bolts 26. This simple arrangement allows the handle 27 to be easily adjusted fore and aft and to be removed expeditiously, when desired. The four front screws 26 serve the dual function of attaching the caster mounting plate 25 to the board and securing the handle clamps 30, see FIG. 2.

It should be noted that the balancing handle 27 is not connected with the front caster wheel 23 for steering purposes and both caster wheels of the vehicle are freely swiveled independently and may rotate in either direction a full 360 degrees on their swivel axes while simultaneously rolling on the pavement or other surface where the scooter vehicle is used.

A main attribute of the invention resides in its high maneuverability and in the wide variety of movements which a rider may achieve. Some of these complex movements are shown in diagrammatic views 5 through 13.

For example, FIGS. 5 and 6 illustrate how the vehicle can be caused to travel on an angled or diagonal path of movement in either of two directions by shifting the rider's weight to the left or to the right on the foot board 20 while pressing the handle 27 toward the desired direction of movement.

FIGS. 7 and 8 depict how the rider may turn the scooter vehicle to the right or to the left during forward travel primarily by weight shifting and foot pressure above the front caster wheels to turn them.

FIGS. 9 and 10 show how the vehicle can be steered or turned through swiveling of the rear end casters 23, again by proper shifting of weight and foot pressure.

FIGS. 11 and 12 illustrate the vehicle can be caused to revolve in either direction a full 360 degrees horizontally while coasting forwardly. This maneuver is also attained by proper foot pressure on the foot board 20 and with some assistance from the handle 27.

Finally, FIG. 13 illustrates how the vehicle can be caused to move laterally or sidewise. These maneuvers and others can be safely accomplished after some practice by the rider. Unlike the customary skate board, the balancing handle 27 renders the castered scooter comparatively safe.

FIG. 14 shows the approximate customary position on the board 20 of the rider's front foot 31 and rear foot 32. However, with experience and practice, a given rider may wish to position the feet somewhat differently. In general, however, for normal coasting and maneuvering, the feet will be located between the two caster wheels and near the center of the board 20.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A scooter type coaster vehicle comprising a foot board, fore and aft spaced tandem caster wheels on the bottom of the foot board and each freely and independently swiveled for a full 360° of rotation in either direction on a swivel axis substantially normal to the foot board, a forward balancing handle for the vehicle attached fixedly to the foot board and rising thereabove, and said balancing handle having a top hand grip portion arranged substantially above the swivel axis of the forward caster wheel of the vehicle.

2. A scooter type coaster vehicle as defined in claim 1, and said balancing handle being bifurcated near its lower end to form a pair of substantially parallel longitudinal handle mounting extensions beneath the forward end portion of said foot board in straddling relationship to the forward caster wheel, and releasable clamp elements on the bottom of the foot board engaging said parallel extensions whereby the extensions are held fixedly against the bottom of the foot board and can be adjusted fore and aft relative to the foot board.

3. A scooter type coaster vehicle as defined in claim 2, and said forward caster wheel having a mounting plate engaging the bottom of the foot board between said parallel handle extensions symmetrically, and fastener elements common to said caster mounting plate and said clamp elements for anchoring both rigidly to the foot board.

4. A scooter type coaster vehicle as defined in claim 3, and said fastener elements and clamp elements being four in number and arranged in a rectangular array.

5. A scooter type coaster vehicle as defined in claim 1, and said handle top hand grip portion being vertically adjustable.

6. A scooter type coaster vehicle comprising an elongated foot board having forward and rear ends, a single pair of fore and aft tandem caster wheels on the bottom of the foot board at the longitudinal center thereof and each being freely and independently swiveled for 360° of rotation about a rotational axis normal to the plane of the foot board, said caster wheels disposed near and inwardly of the forward and rear ends of the foot board, and a balancing handle for the vehicle fixed to and rising from a forward end portion of the foot board and having an upper hand grip substantially in alignment with the rotational axis of the forward caster wheel.

7. A scooter type coaster vehicle comprising an elongated foot board, a pair of fore and aft spaced tandem caster wheels positioned on the bottom of the foot board along the longitudinal center thereof and each being freely and independently swiveled for 360° of rotation about a rotational axis normal to the plane of the foot board, said fore and aft caster wheel being disposed near and inwardly of the forward and rear ends of the foot board respectively and providing the sole means for rotational support, and a balancing handle for the vehicle which extends upward above the forward end of the footboard.

8. A scooter type coaster vehicle as defined in claim 7 and each of said spaced caster wheels being a single wheel.

* * * * *